(12) United States Patent
Scott

(10) Patent No.: US 12,055,358 B2
(45) Date of Patent: Aug. 6, 2024

(54) REDUCED WEIGHT SEMIAUTOMATIC PISTOL SLIDES AND ASSOCIATED METHODS

(71) Applicant: Brave Response Shooting, LLC, Highland, UT (US)

(72) Inventor: Brandon R. Scott, American Fork, UT (US)

(73) Assignee: Brave Response Shooting, LLC, Highland, UT (US)

( * ) Notice: Subject to any disclaimer, the term of this patent is extended or adjusted under 35 U.S.C. 154(b) by 0 days.

(21) Appl. No.: 17/579,356

(22) Filed: Jan. 19, 2022

(65) Prior Publication Data

US 2022/0252364 A1 Aug. 11, 2022

Related U.S. Application Data

(63) Continuation of application No. PCT/US2020/042802, filed on Jul. 20, 2020.

(60) Provisional application No. 62/876,033, filed on Jul. 19, 2019.

(51) Int. Cl.
*F41A 3/66* (2006.01)

(52) U.S. Cl.
CPC .................................. *F41A 3/66* (2013.01)

(58) Field of Classification Search
CPC .................................................. F41A 3/66
See application file for complete search history.

(56) References Cited

U.S. PATENT DOCUMENTS

| | | | |
|---|---|---|---|
| 8,528,243 B1 * | 9/2013 | Glock | F41A 3/66 42/75.02 |
| 10,982,917 B1 * | 4/2021 | Schober | F41A 3/66 |

* cited by examiner

*Primary Examiner* — J. Woodrow Eldred
(74) *Attorney, Agent, or Firm* — DENTONS Durham Jones Pinegar

(57) ABSTRACT

A slide for a semiautomatic pistol includes features that reduce weight while maintaining structural rigidity and performance of the slide. The semiautomatic pistol slide may include one or more weight-reducing recesses and a structurally supportive insert within each weight-reducing recess. Methods and systems for fabricating semiautomatic pistol slides and other articles of manufacture that include weight-reducing recesses with structurally supportive inserts therein are also disclosed. Such a method may include a compression molding technique. Such a system may include a compression molding assembly.

7 Claims, 5 Drawing Sheets

REDUCED WEIGHT SEMIAUTOMATIC PISTOL SLIDES AND ASSOCIATED METHODS

CROSS-REFERENCE TO RELATED APPLICATION

This application is a continuation of International Application No. PCT/US2020/042802, filed Jul. 20, 2020 and titled REDUCED WEIGHT SEMIAUTOMATIC PISTOL SLIDES AND ASSOCIATED METHODS ("the '802 PCT Application"), which claims priority to the Jul. 19, 2019 filing date of U.S. Provisional Patent Application 62/876,033, titled REDUCED WEIGHT SEMIAUTOMATIC PISTOL SLIDES AND ASSOCIATED METHODS ("the '033 Provisional Application") is hereby made. The entire disclosures of the '802 PCT Application and '033 Provisional Application are hereby incorporated herein.

TECHNICAL FIELD

This disclosure relates to slides for semiautomatic pistols and, more specifically, to semiautomatic pistol slides that include features that reduce weight while maintaining structural rigidity and performance. Even more specifically, this disclosure relates to semiautomatic pistol slides that include one or more weight-reducing recesses and a structurally supportive insert within each weight-reducing recess. This disclosure also relates to methods for fabricating semiautomatic pistol slides and other articles of manufacture that include weight-reducing recesses with structurally supportive inserts therein.

RELATED ART

Semiautomatic pistols include slides. As a semiautomatic pistol fires a bullet, recoil typically forces the slide of the semiautomatic pistol backward, which enables the slide to eject the shell that previously held the just-fired bullet. The slide then moves forward, pushing another round into the chamber of the semiautomatic pistol.

The slide of a semiautomatic pistol is typically manufactured from a material with a tensile strength and stiffness, or tensile modulus (i.e., Young's modulus) that will provide the structural integrity needed to repeatedly withstand the recoil of the semiautomatic pistol, as well as repeated back and forth movement while maintaining the precision needed to repeatedly eject spent shells and chamber, or feed, fresh cartridges and serving as the locking abutment for the barrel of the semiautomatic pistol. Hardened steels have been found to possess the tensile strengths and tensile moduli needed to manufacture the slides of semiautomatic pistols. Typically, the hardened steel of a semiautomatic pistol slide comprises a high carbon, heat-treated steel with a hardness of Rockwell C (RC) 40-55.

Although the density of high carbon, heat-treated steel makes it highly desirable for use in manufacturing the slides of semiautomatic pistols, it also makes semiautomatic pistol slides very heavy. While some manufacturers have tried to use materials other than high carbon, heat-treated steel to manufacture semiautomatic pistol slides, such as aluminum, those semiautomatic pistol slides have not performed as well as high carbon, heat-treated steel.

SUMMARY

For the sake of simplicity, a slide for a semiautomatic pistol, or a semiautomatic pistol slide, may also be referred to herein as a "slide." The term "handgun," as used herein, includes, but is not limited to, semiautomatic pistols.

A slide according to this disclosure may comprise a slide body having substantially the same shape and dimensions as those of a slide body of a conventional slide for the same semiautomatic pistol. The slide body of a slide according to this disclosure may also have at least the same structural integrity as that of the slide body of the conventional slide. But a weight of a slide body of the slide according to this disclosure may be substantially less than a weight of the slide body of the conventional slide for the same semiautomatic pistol. While the slide body of the conventional slide consists of hardened steel (the slide may also include non-essential materials or features, such as paint, decorative features, and the like), the slide body of a slide according to this disclosure may include at least one recess and a corresponding insert within each recess.

A recess within the slide body of a slide according to this disclosure may be defined to extend at least partially through a thickness of a portion of the slide body. The recess may include a base defined by a material of the slide body. In some embodiments, such a recess may not extend completely through the slide body; it may extend partially through the thickness of the slide body. In other embodiments, a central portion of such a recess may extend completely through the thickness of the slide body while one or more peripheral portions of the recess may extend only partially through the thickness of the slide body, defining one or more ledges adjacent to the periphery, or peripheral edge, of the recess. In some embodiments, a recess may have a shape that enables it to receive and mechanically engage a corresponding insert. As an example, the periphery of a recess may include an undercut feature, which extends beyond the periphery of the recess to a location beneath a surface of the slide body.

A recess may be formed in and open to an outer surface of the slide body. Alternatively, a slide body may include a recess formed in and opening to its inner surface (e.g., its surfaces that face a barrel of the semiautomatic pistol, etc.). In embodiments where a slide body includes a plurality of recesses, all of the recesses may open to the outer surface of the slide body, all of the recesses may open to the inner surface of the slide body, or the slide body may include at least one recess in its outer surface and at least one recess in its inner surface.

An insert of a slide according to this disclosure may have a configuration that enables it to fill, substantially fill, or partially fill a corresponding recess in the slide body. A surface of the insert may be continuous, or flush, with or substantially continuous, or substantially flush, with a surface of the slide body. In embodiments where the recess includes an undercut feature, its corresponding insert may include a complementary feature that extends from a periphery of the inset into the undercut feature in the periphery of the recess. These or other complementary features may engage or interlock with one another in a manner that mechanically secures the insert within its corresponding recess.

The material or materials from which each insert is formed (i.e., the "insert material(s)") may be less dense than the material from which the remainder of the slide is formed (e.g., hardened steel, such as high carbon, heat-treated steel, etc.). In addition, the material from which each insert is formed may have a greater tensile strength and/or stiffness, or tensile modulus (or Young's modulus), than the material from which the remainder of the slide is formed. As a nonlimiting example, the insert may be made from a so-called "carbon fiber" material, which includes a composite of carbon fibers and a resin. More specifically, the insert may be defined from a so-called "prepreg carbon fiber," which includes a carbon fiber fabric that has been pre-impregnated with a resin system (e.g., an epoxy and a corresponding curing agent, etc.).

By eliminating a portion of the material of the slide, each recess of a slide of this disclosure may eliminate some of the weight of the slide; thus, each recess may comprise a weight-reducing recess. Each insert may at least partially fill its corresponding recess in a manner that replaces any loss in the structural integrity of the slide due to the presence of the recess in the slide. The material from which each insert is formed may be less dense than the material from which the remainder of the slide is formed (e.g., hardened steel, such as high carbon, heat-treated steel, etc.). Thus, the recess(es) and insert(s) may impart the slide with less weight than a conventional slide of the same overall design (i.e., a slide for the same handgun, but without the recess(es) and the insert(s)) and at least the same structural integrity as the conventional slide of the same overall design.

Recesses may be formed in a slide body as the slide body is manufactured (e.g., during casting processes, machining processes, etc.). Alternatively, recesses may be formed in a slide body after the original manufacture of the slide body (e.g., by machining processes, etc.); for example, for use with a previously purchased handgun, as part of customization of a handgun, or the like.

The insert may be formed, or defined, within its corresponding recess. In a specific, but non-limiting embodiment of a process for defining such an insert, a slide body with one or more recesses defined in a surface thereof may be assembled with a fixture, or base, of a compression mold that will support the slide body. Insert material(s) may then be introduced over or in the recess within which the insert is to be formed. In some embodiments, the insert material(s) may be trimmed to shape before it (they) is (are) introduced into or over the recess. A plurality of layers of the insert material(s) may be introduced into a recess—the number of layers depending at least in part on the depth of the recess in which the insert is to be formed. A compression mold may then be positioned over the insert material(s) and the recess.

The compression mold may include an insert mold, an expandable element, and a cover. The insert mold may include a mold cavity in one surface. The mold cavity is made to be positioned over the insert material(s) and the recess, and may include a hard mold surface (e.g., a steel surface, an aluminum surface, etc.) that will define an outer surface of the insert. An opposite surface of the insert mold carries the expandable element. The cover is positioned and held in place over the expandable element and the opposite surface of the insert mold.

Such a compression mold may have an open configuration that may enable heated air to flow around each compression mold in a manner that enables the assembly to be quickly and efficiently heated to a temperature that will facilitate expansion of the expandable element(s) of the compression mold, compression of the insert material, and liquefaction of the insert material or a component thereof.

Compression molds and compression molding techniques such as those disclosed herein may be used in a variety of manufacturing processes to fabricate other articles of manufacture.

Other aspects of the disclosed subject matter, as well as features and advantages of various aspects of the disclosed subject matter, will become apparent to those of ordinary skill in the art through consideration of the ensuing description, the accompanying drawings, and the appended claims.

DETAILED DESCRIPTION

Figure 1:
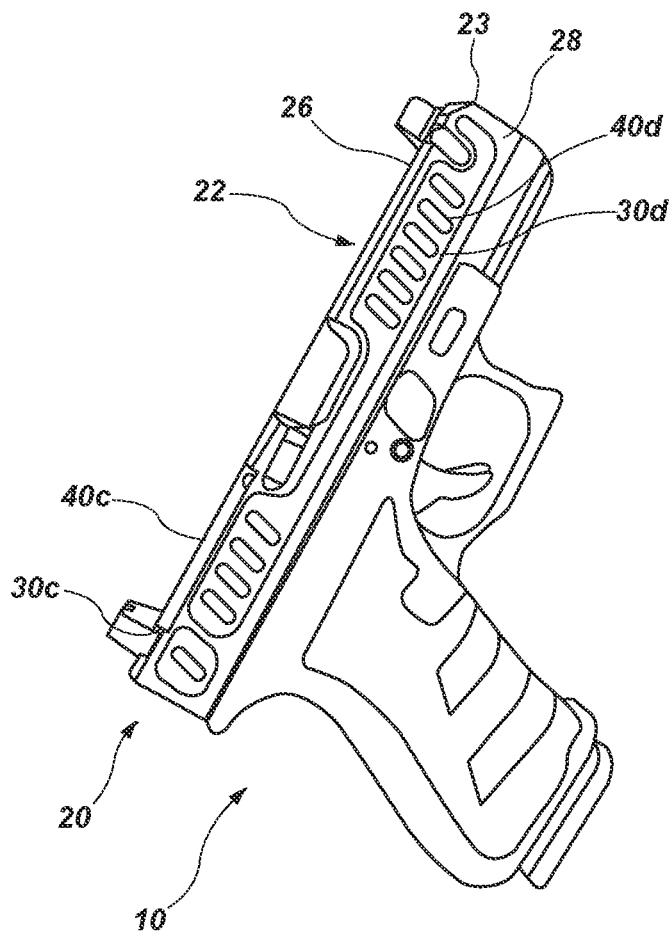
FIG. 1 is a side view of an embodiment of a slide of a handgun showing the slide assembled with a remainder of the handgun, the slide including recesses and inserts within the recesses.
Figure 2:
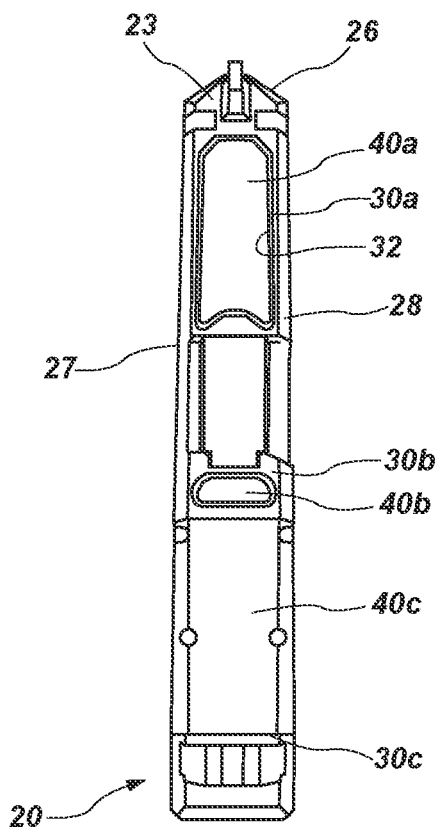
FIG. 2 is a top view of the slide and handgun shown in FIG. 1.

With reference to FIGS. 1 and 2, an embodiment of a handgun 10 is depicted. The handgun 10 comprises a semi-automatic pistol and includes a slide 20. The slide 20 includes a body 22. The body 22 of the slide 20 has an outer surface 23 and an inner surface 24 (not shown in FIG. 1 or FIG. 2). The slide 20 includes a top portion 26, as well as side portions 27 and 28 extending downwardly from opposite sides of the top portion 26.

A plurality of recesses 30*a*, 30*b*, etc., are formed in the outer surface 23 of the body 22 of the slide 20. Each recess 30*a*, 30*b*, etc., may carry an insert 40*a*, 40*b*, etc., respectively. For the sake of simplicity, each recess 30*b*, 30*b*, etc., may be referred to hereinafter as a "recess 30," while any plurality of recesses 30*a*, 30*b*, etc., may be referred to hereinafter as "recesses 30." Likewise, each insert 40*a*, 40*b*, etc., may be referred to hereinafter as an "insert 40," while any plurality of inserts 40*a*, 40*b*, etc., may be referred to hereinafter as "inserts 40."

The body 22 of the slide 20 may be formed from a material that has conventionally been used to form the slides of handguns. Without limitation, the body 22 may be formed from a high carbon, heat-treated steel; for example, a high carbon, heat-treated steel with a hardness of Rockwell C (RC) 40-55. Each insert 40 may be formed from a material that has a lower density than the material from which the body 22 is formed, but has a tensile strength and/or a stiffness, or tensile modulus (or Young's modulus) that is about the same or greater than a tensile strength and/or tensile modulus of the material from which the body 22 is formed. As a nonlimiting example, each insert 40 may be made from a carbon fiber material, such as a prepreg carbon fiber. In some embodiments, a component of the material from which the insert 40 is formed may chemically bond to the material of the body 22 of the slide 20.

Figure 3:
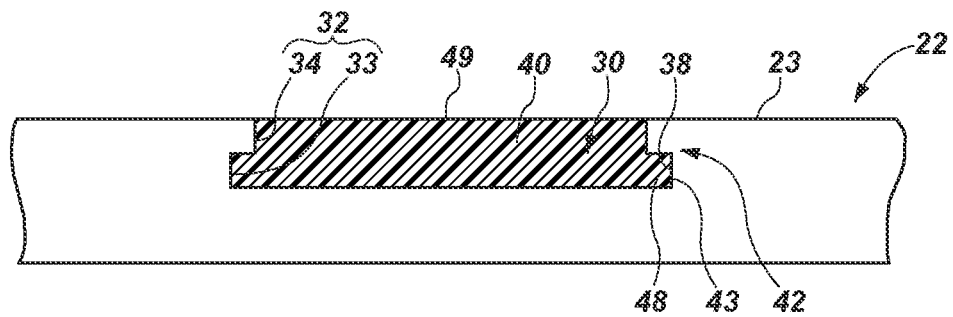
FIG. 3 is a cross-sectional representation showing an embodiment of a recess that extends only partially into a surface of an article of manufacture, such as a slide of a handgun, and of an insert within the recess.

Turning now to FIG. 3, an embodiment of a recess 30 and an embodiment of an insert 40 within the recess 30 are depicted. The recess 30 extends into a surface of a substrate, such as the outer surface 23 of the body 22 of a slide 20 (FIGS. 1 and 2) of a handgun 10 (FIGS. 1 and 2) or another substrate or article of manufacture, but not completely through the substrate. A periphery 32 of the recess 30 includes one or more undercut features 38, or recesses. As illustrated, an undercut feature 38 may be located near a base 33 of the periphery 32 of the recess 30. As an alternative or in addition, an undercut feature 38 may be located at an intermediate height 34 along the periphery 32. In some embodiments, an undercut feature 38 may extend along an entire length of the periphery 32 of the recess 30.

An undercut feature 38 of the recess 30 may receive and engage a complementary protrusion 48 from a base 43 of a peripheral edge 42 of an insert 40 within the recess 30. As illustrated, an outer surface 49 of the insert 40 may be flush or substantially flush (i.e., coplanar, etc.) with the outer surface 23 of the body 22 of the slide 20. Alternatively, the outer surface 49 of the insert 40 may protrude beyond the outer surface 23 of the body 22 of the slide 20. As another alternative, the outer surface 49 of the insert 40 may be recessed relative to the outer surface 23 of the body 22 of the slide 20.

Figure 4:
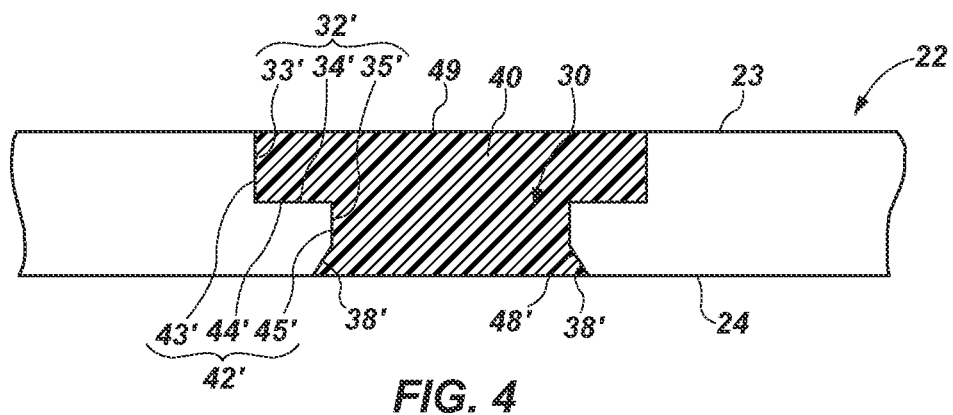
FIG. 4 is a cross-sectional representation showing an embodiment of a recess that extends completely through a portion of an article of manufacture, such as a slide of a handgun, and of an insert within the recess.

FIG. 4 shows another embodiment of the recess 30' that extends completely through a substrate; for example, from the outer surface 23 to the inner surface 24 of the body 22 of a slide 20 of a handgun 10, such as that shown in FIGS. 1 and 2, or another substrate or article of manufacture. The recess 30' includes a periphery 32'. A first portion 33' (e.g., an upper portion, etc.) of the outer periphery 32' may be offset from a second portion 35' (e.g., a lower portion, etc.) of the outer periphery 32'. In embodiments where the first portion 33' and the second portion 35' are offset, the periphery 32' may include a ledge 34' between the first portion 33' and the second portion 35'. The outer periphery 32' may include one or more undercut features 38'. In the depicted embodiment, the second portion 35' of the periphery 32' may be undercut; for example, obliquely to an orientation of the first portion 33' of the periphery 32'.

FIG. 4 also depicts another embodiment of an insert 40'. The insert 40' includes a periphery 42' with a first portion 43', a ledge 44', a second portion 45', and a protrusion 48' that are complementary to the upper portion 33', the ledge 34', the second portion 35', and the undercut 38', respectively, of the periphery 32' of the recess 30'. An outer surface 49' of the insert 40' may be flush or substantially flush (i.e., coplanar, etc.) with the outer surface 23 of the body 22 of the slide 20. Alternatively, the outer surface 49' of the insert 40' may protrude beyond the outer surface 23 of the body 22 of the slide 20. As another alternative, the outer surface 49' of the insert 40' may be recessed relative to the outer surface 23 of the body 22 of the slide 20.

Figure 5:
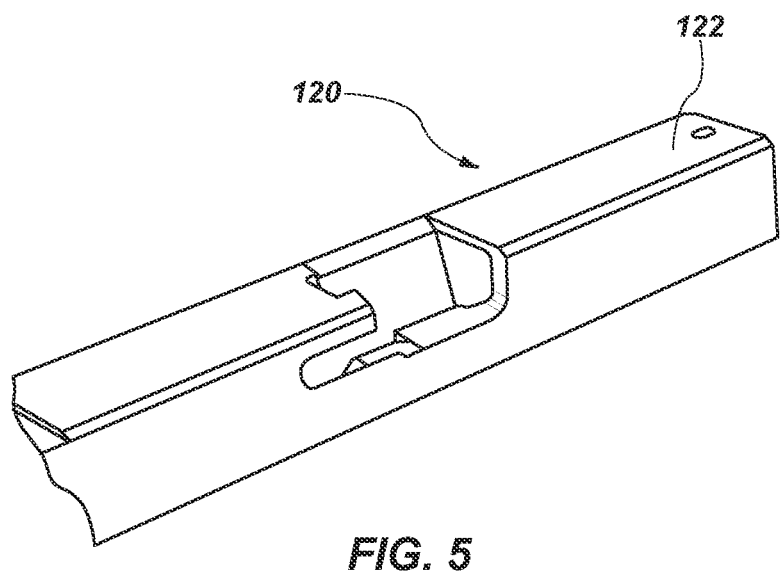
FIG. 5 is a perspective view of conventional a slide for a handgun.

FIG. 5 illustrates an embodiment of a body 122 of a slide 120 for a handgun. The body 122 illustrated by FIG. 5 lacks recesses.

Figure 6:
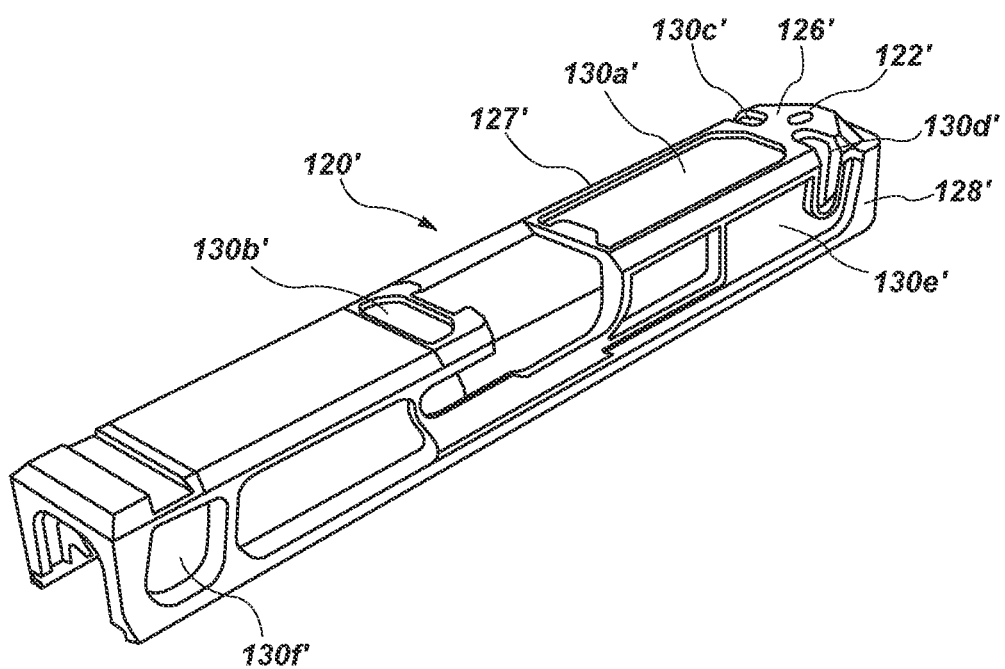
FIG. 6 is a perspective view of a variation of the slide shown in FIG. 5 with recesses defined in top and side portions of an outer surface of the slide.

FIG. 6 shows another embodiment of a body 122' of a slide 120' for the same type of handgun as the slide 120 illustrated by FIG. 5. The body 122' shown in FIG. 6 includes a top portion 126' in which recesses 130a' and 130b' are formed. In addition, another recess 130c' extends from the top portion 126' to a side portion 127' of the body 122', while yet another recess 130d' extends from the top portion 126' to another side portion 128' of the body 122'. Further recesses 130e', 130f are formed in the side portion 128' of the body 122'.

Figure 7:
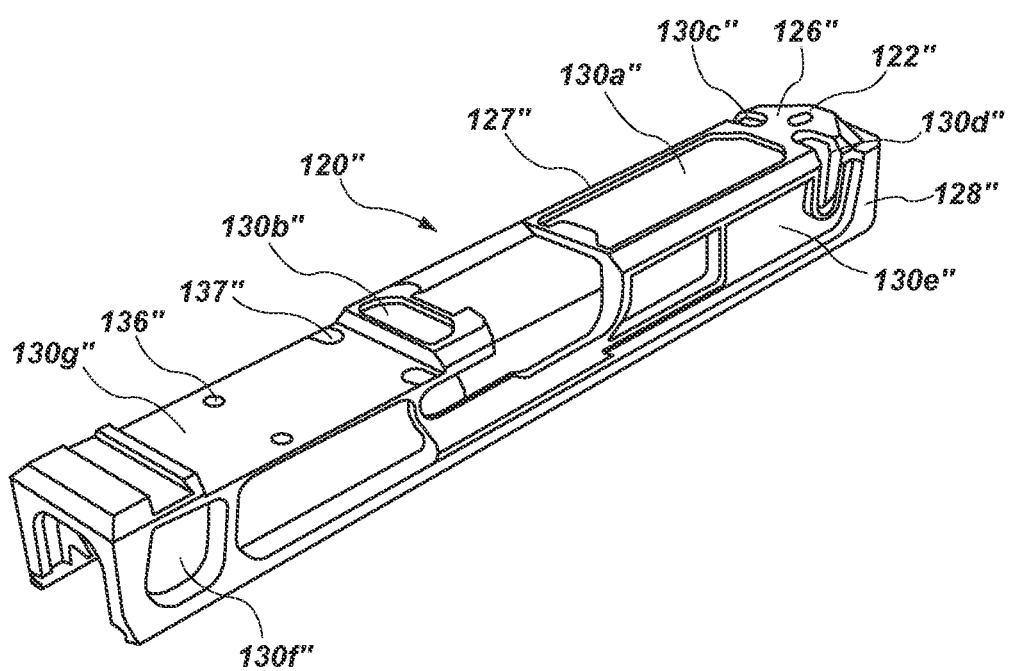
FIG. 7 is a perspective view of another variation the slides shown in FIGS. 5 and 6, with an additional recess defined in the top portion of the outer surface of the slide.

The embodiment of body 122" depicted by FIG. 7 includes recesses 130a"-130h" that are formed at the same locations of recesses 130a'-130f, respectively, in the embodiment of body 122' shown in FIG. 6. In addition, the body 122" depicted by FIG. 7 includes a further recess 130g" in the top portion 126" of the body 122". That recess 130g" includes insert engaging features 136" and 137". The insert engaging features 136" comprise apertures in a base 131" of the recess 130", which will receive a material that defines an insert for the recess 130g" as the insert is formed in or introduced into the recess 130g". The insert engaging features 137" comprise protrusions that engage an insert as the insert is formed in or introduced into the recess 130g".

Figure 8:
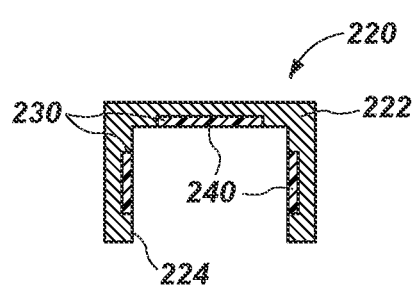
FIG. 8 is a cross-sectional representation of a slide with a recess formed in an inner surface thereof.
Figure 9:
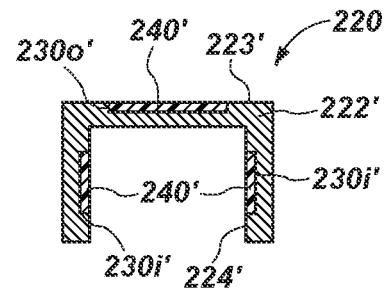
FIG. 9 is a cross-sectional representation of a slide with recesses formed inner and outer surfaces thereof.

The recesses 30 (and 30', 130', and 130") of the embodiments of slides 20 (and 20', 120, 120', and 120") depicted by FIGS. 1-7 are formed in and open to the outer surfaces 23 of the bodies 22 of the slides 20. The inserts 40 (and 40') in such recesses 30 may enhance the appearance of the slides 20. In other embodiments, a body of a slide for a handgun may include recesses in an inner surface of the body. For example, FIG. 8 depicts an embodiment of a slide 220 with a body 222 that includes inner recesses 230 in an inner surface 224 of the body 222 and inserts 240 within the inner recesses 240. As another example, FIG. 9 shows an embodiment of a slide 220' that includes a body 222' with one or more outer recesses 230o' in an outer surface 223' of the body 222' and one or more inner recesses 230i' in an inner surface 224' of the body 222'. An insert 240' may be carried by each inner recess 230i'. Inserts 240, 240' within inner recesses 230, 230i' may reduce any friction between the slide 220, 220' and other features of the handgun the slide 220, 220' contacts.

Figure 10:
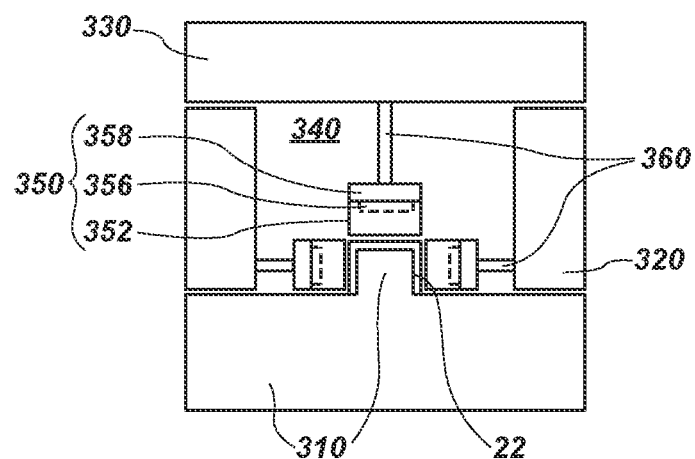
FIG. 10 is a schematic representation of an embodiment of a compression mold.

In some embodiments, an insert 40 (or an insert 40', 240, 240') may be formed, or defined, within its corresponding recess 30 (or recess 30', 130', 130", 230, 230o', 230i'). In a specific, but non-limiting embodiment of a process for defining such an insert, a compression mold assembly 300 may be used to define each insert 40. As illustrated by FIG. 10, a compression mold assembly 300 may include a fixture 310, or a base, side walls 320 extending upwardly at or adjacent to edges 312 of the fixture 310, and a lid 330. Together, the fixture 310, the side walls 320, and the lid 330 define an interior 340 of the compression mold assembly 300. One or more compression molds 350 of the compression mold assembly 300 may be located within the interior 340.

Figure 11:
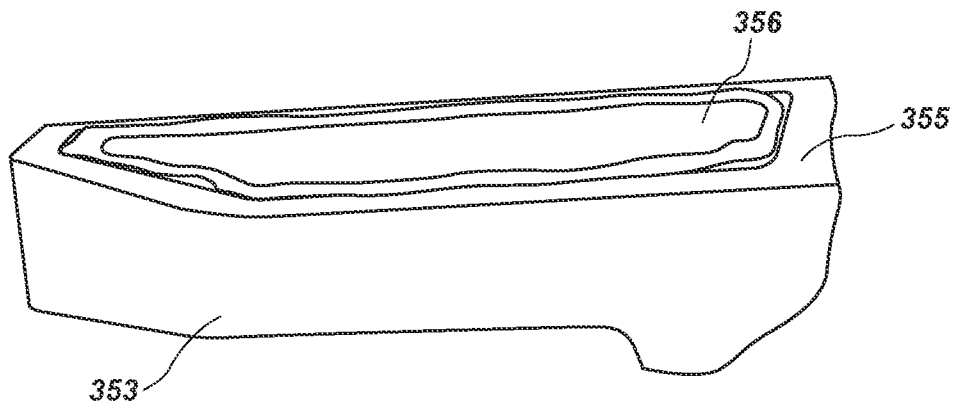
FIG. 11 is a perspective view of an embodiment of insert mold of a compression mold.
Figure 14:
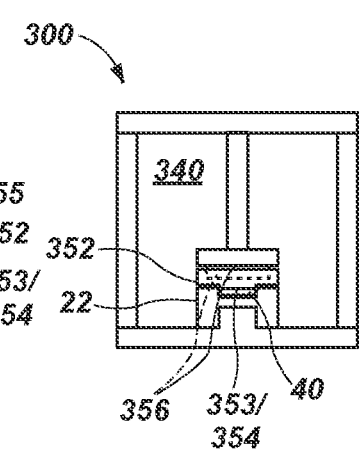

Each compression mold 350 may include an insert mold 352, an expandable element 356, and a cover 358. The insert mold 352 may include a mold cavity 353 in one surface thereof. The mold cavity 353 may be made to be positioned over the insert materials 42 (FIG. 12) and the recess 30 (FIG. 12) in the body 22 of a slide 20 (FIGS. 1 and 2) or another article of manufacture. The mold cavity 353 may include a hard mold surface 354 (e.g., a steel surface, an aluminum surface, etc.) that will define an outer surface 49 of the insert 40 (FIG. 14). With added reference to FIG. 11, an opposite surface 355 of the insert mold 352 carries the expandable element 356. The expandable element 356 may be at least partially held on the opposite surface 355 of the insert mold 352 or within a recess in the opposite surface 355 of the insert mold 352. In some embodiments, the expandable element 356 may comprise an elastomeric polymer, such as a silicone. The cover 358 of the compression mold 350 is positioned and held in place over the expandable element 356 and the opposite surface 355 of the insert mold 352.

Shoulder bolts 360 may hold each compression mold 350 in place over a corresponding recess 30 in the body 22 of the slide 20 (FIGS. 1 and 2). More specifically, each shoulder bolt 360 may extend from an adjacent side wall 320, lid 330, or other feature that defines the interior 340 of the compression mold assembly 300, across a portion of the interior 340, to the cover 358 of the compression mold 350 that corresponds to the shoulder bolt 360. The interior 340 of the compression mold assembly 300 may have an open configuration, which may enable heated air to flow around each compression mold 350 in a manner that enables the compression mold 350 to be quickly and efficiently heated to a temperature that will facilitate the formation of one or more inserts 40 (FIGS. 1 and 2) in corresponding recesses 30 (FIGS. 1 and 2).

Figure 12:
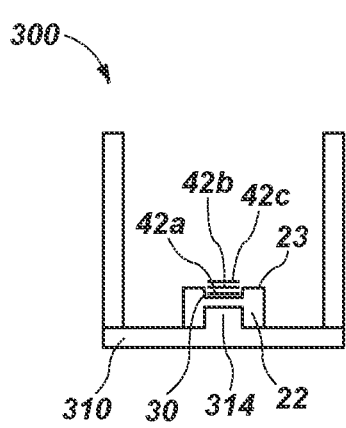
FIGS. 12-14 are schematic representations showing use of an embodiment of a compression mold similar to that depicted by FIG. 10 to form an article of manufacture, such as the inserts in the recesses of the slide of FIGS. 1 and 2.
Figure 13:
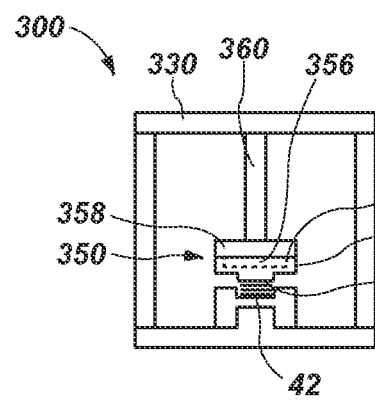

Referring now to FIGS. 12-14, an embodiment of use of a compression mold assembly 300 to define one or more inserts 40 is schematically depicted. As illustrated by FIG. 12, a body 22 of a slide 20 (FIGS. 1 and 2) or other substrate or article of manufacture with one or more recesses 30 defined in a surface 23 of the body 22 may be assembled with a support 314 of the fixture 310 of the compression mold assembly 300. The insert materials 42 from which the insert 40 (FIG. 14) is to be formed may be placed in the recess 30. In some embodiments, including those where the insert materials 42 comprise a prepreg material, a plurality of layers 42a, 42b, etc., of the prepreg material may be introduced into the recess 30. The number of layers 42a, 42b, etc., may depend at least in part on the depth of the recess 30 in which the insert 40 is to be formed. In some embodiments, the insert materials 42 may be trimmed to shape before they are introduced into or over the recess 30.

As shown in FIG. 13, a compression mold 350 of the compression mold assembly 300 may then be positioned over the insert materials 42 and the recess 30. More specifically, the insert mold 352 may be positioned adjacent to the insert materials with the mold cavity 353 of the insert mold 352 and the hard mold surface 354 of the mold cavity 353 facing or even contacting the insert materials 42 to enable the hard mold surface 354 to define a shape of an outer surface 49 (FIG. 3) of the insert 40. The opposite surface 355 of the insert mold 352 is located on an opposite side of the insert mold 352 from the mold cavity 353, the expandable element 356 of the compression mold 350 is positioned against the opposite surface 355, and the cover 358 of the compression mold 350 is positioned against the expandable element 356. The lid 330 of the compression mold assembly 300 may be secured to a remainder of the compression mold assembly, with a shoulder bolt 360 pressing the compression mold 350 against the insert materials 42.

Turning now to FIG. 14, heat may be introduced into the interior 340 of the compression mold assembly 300 to define each insert 40 from the insert material 42 (FIGS. 12 and 13). In some embodiments, the entire compression mold assembly 300 may be heated (e.g., by placement within an oven, etc.). Upon heating the compression mold assembly to a sufficient temperature for a sufficient duration of time (e.g., for a prepreg carbon fiber, 180° F. for 4 hours, 300° F. for one hour, 325° F. for about an hour, 350° F. for about an hour, etc.), the expandable element 356 expands, forcing the insert mold 352 and its mold cavity 353 and hard mold surface 354 against the insert materials 42 (FIGS. 12 and 13) and against the body 22 or other substrate or article of manufacture. The combined heat and pressure may cause the insert material 42 or a component thereof (e.g., the resin system of a prepreg carbon fiber, etc.) to cure and, thus, defining the insert 40.

The compression mold assembly 300 may then be disassembled and the body 22 or other substrate or article of manufacture may be removed from the fixture 310. Any excess insert material 42 may be trimmed or otherwise removed from the body 22 and from around the newly formed insert 40. As an example, with returned reference to FIGS. 1 and 2, any portion of an insert 40 that extends beyond the periphery 32 of its corresponding recess 30 and over the corresponding surface (e.g., the outer surface 23) of the body 22 of the slide 20 or other substrate or article of manufacture may be removed.

Although the above-described process has been described in reference to defining inserts 40 for a slide 20 of a handgun, the same process and similar processes may be used to compressively mold a variety of articles of manufacture from prepreg carbon fibers and a variety of other heat and/or pressure curable materials.

Although this disclosure provides many specifics, the specifics should not be construed as limiting the scope of any appended claim, but merely as providing information pertinent to some specific embodiments that may fall within the scopes of the appended claims. Features from different embodiments may be employed in combination. In addition, the scope of each appended claim may encompass other, undisclosed embodiments. All additions to, deletions from, and modifications of the disclosed subject matter that fall within the scopes of the claims are to be embraced by the claims.

What is claimed:

1. A method for manufacturing or modifying a handgun slide, comprising:
   defining a recess in a surface of a slide body of the handgun slide; and
   forming an insert in the recess to increase a structural integrity of the handgun slide, including:
   introducing an insert material into the recess in the surface of the slide body;
   introducing the slide body into a compression mold; and
   causing the compression mold to compress the insert material into the at least one recess.

2. The method of claim 1, wherein defining the recess comprises defining the recess in a previously manufactured handgun slide.

3. The method of claim 1, wherein defining the recess comprises defining the recess with an undercut feature in a peripheral edge of the recess, extending beneath the surface of the slide body.

4. The method of claim 1, wherein introducing the insert material into the recess comprises introducing a carbon fiber material that has been preimpregnated with a curable resin into the recess.

5. The method of claim 4, wherein causing the compression mold to compress comprises heating the compression mold, causing an expandable element within the compression mold to expand, causing the expandable element to exert force against the insert material, and causing the curable resin to cure.

6. The method of claim 5, wherein causing the expandable element within the compression mold to expand includes forcing a hard cavity surface of the compression mold against the insert material.

7. The method of claim 1, further comprising:
trimming excess insert material at locations outside the recess in the surface of the slide body from the surface of the slide body.

\* \* \* \* \*